United States Patent [19]

Houben

[11] 3,970,465
[45] July 20, 1976

[54] METHOD OF COMPOSING A MIXTURE FOR LEAD GLASS

[75] Inventor: Mathijs Maria Hendrikus Houben, Eersel, Netherlands

[73] Assignee: U.S. Philips Corporation, New York, N.Y.

[22] Filed: May 7, 1975

[21] Appl. No.: 575,189

[30] Foreign Application Priority Data
May 7, 1974 Netherlands.................... 7406083

[52] U.S. Cl............................ 106/53; 106/DIG. 8
[51] Int. Cl.$^2$...................... C03C 3/10; C03C 3/04
[58] Field of Search........................ 106/DIG. 8, 53

[56] References Cited
UNITED STATES PATENTS
3,843,376  10/1974  Cornelissen et al. .......... 106/DIG. 8

*Primary Examiner*—Winston A. Douglas
*Assistant Examiner*—Mark Bell
*Attorney, Agent, or Firm*—Frank R. Trifari; Daniel R. McGlynn

[57] ABSTRACT

A glass mixture for preparing lead-containing glass of the composition in % by weight:

| | | | | |
|---|---|---|---|---|
| $SiO_2$ | 20–65 | | $B_2O_3$ | <25 |
| $PbO$ | 12–60 | | $CaO$ | <4 |
| $Al_2O_3$ | 0.5–5 | | $BaO$ | <8 |
| $Na_2O$ | <16 | combined | $MnO$ | <1 |
| $K_2O$ | <16 | >1.5 | $As_2O_3/Sb_2O_3$ | <1 | with quartz sand having a particle size of ≤ 100 μm and felspars having a particle size of ≤ 100 μm.

2 Claims, No Drawings

METHOD OF COMPOSING A MIXTURE FOR LEAD GLASS

The invention relates to a method of composing a glass mixture comprising quartz sand, felspar and other glass-forming components intended for the manufacture of lead glass.

Lead glasses include those glasses within the range of compositions limited as follows in % by weight:

| | | | |
|---|---|---|---|
| $SiO_2$ | 20–65 | ZnO | 0–12 |
| $B_2O_3$ | 0–25 | PbO | 12–60 |
| $Na_2O$ | 0–16 ⎫ combined | $Al_2O_3$ | 0.5–5 |
| $K_2O$ | 0–16 ⎭ >1.5 | $As_2O_3$ and/or | 0–1 |
| CaO | 0–4 | $Sb_2O_3$ | |
| BaO | 0–8 | MnO | 0–1 |

The mixture used for preparing these types of glasses comprises quartz sand, optionally corrected for $SiO_2$ present in other materials, felspar ($NaAlSi_3O_8$ – $KAlSi_3O_8$), alkali carbonates and/or alkali hydroxides for suppletion of alkali oxide, minium or lead silicate and optionally calcite, dolomite, barium carbonate, zinc white and/or boric acid or borax.

In the glass obtained from this mixture difficulties occur due to gas inclusions. When drawing a tube from this glass, these inclusions become manifest as striae consisting, inter alia, for superficially open furrows in the drawing direction.

It was found from investigations prior to the present invention that the choice of the grain size of quartz sand and felspar is of essential importance for the melting behavior of the mixture in which these materials are present.

According to the U.K. Pat. No. 1,357,063 a mixture for a borosilicate glass consisting of a pulverulent mixture of quartz powder, pulverulent felspar and other glass-forming components is prepared while using quartz powder having a particle size at least 90% of which is between 30 and 120 μm, and felspar having a particle size at least 90% of which is between 30 and 120 μm. In this manner a very large reduction of the melting time and the refining time is achieved. The time required to prepare the mixture may be up to 50% shorter than the time for preparing a mixture in which the materials are present with a non-selected particle size, i.e. with a considerable portion of larger grains and also with grains having a particle size of less than 30 μm. Particularly materials having a smaller particle size were found to have a considerable negative influence.

It was found that for preparing a mixture to TV glass there was a quite different requirement to be satisfied by quartz sand and felspar in the mixture (U.S. Pat. application Ser. No. 400,402). A considerable acceleration of the melting process is likewise obtained, considering the freedom from inclusions in the glass melt and the dissolution of crystalline constituents, if in the mixture sodium and/or potassium felspar powder is used, the specific area of which is larger than 1 sq.m/gram in addition to quartz sand the specific area of which is smaller than 0.1 sq.m/gram.

According to the invention a possibility to accelerate the melting process was also found for the type of glass denoted by the name of lead glass and defined above, by selection of the particle size of quartz sand present in the mixture and, optionally, felspar. Surprisingly, the requirements were found to be quite different from those for the above-described TV glasses and borate glasses.

According to the invention the method of preparing a mixture for lead glass is characterized in that quartz sand present therein has a particle size of not more than 100 μm and felspar has a particle size of not more than 100 μm.

The effect of the invention will be illustrated in the following Tables. The periods of time within which the melt is free from inclusions are stated as criteria.

In this case a lead glass is concerned which is melted at a temperature of 1430°C in platinum crucibles of 100 cubic cm. in an electric furnace and which has the following composition in % by weight:

| | | | |
|---|---|---|---|
| $SiO_2$ | 60.2 | PbO | 21.3 |
| $Al_2O_3$ | 1.3 | $Sb_2O_3$ | 0.3 |
| $Na_2O$ | 10.0 | | |
| $K_2O$ | 5.4 | | |

The following mixture is required per 100 g of glass:

| | |
|---|---|
| quartz sand | 56.8 kg |
| sodium carbonate | 15.3 kg |
| potassium carbonate | 8.0 kg |
| lead silicate | 25.0 kg |
| aluminium oxide | 1.2 kg |
| sodium nitrate | 3.1 kg |
| antimony oxide | 0.3 kg |

The mixture is melted at a temperature of approximately 1300°C.

Sand of 3 different origins and felspar of 4 different qualities are used in the mixture, with the distribution of the grain size as mentioned below. The felspar was (1) flotation felspar from Norway, (2) Habera felspar from Germany, (3) sieved Habera felspar and (4) felspar from Norway, supplied by the firm Bjorum. The sand was supplied by the firm Duinger from Germany (1), quartz powder from the firm Sibelco (2) of Belgium and (3) from Dowson and Dobson (South Africa).

| | Distribution of grain size | | | | | | |
|---|---|---|---|---|---|---|---|
| | felspar | | | | sand | | |
| | 1 | 2 | 3 | 4 | 1 | 2 | 3 |
| >315 μm | 5% | 1.0% | | | 0.3% | | |
| >200 μm | 34% | 8.5% | | | 6 % | | |
| >160 μm | 62% | 25 % | | | 49 % | | |
| >100 μm | 82% | 39 % | 8.3% | 1.0% | 95 % | | 2% |
| > 63 μm | 98% | 56 % | 6 % | 11.0% | 99.7% | | 80% |
| > 45 μm | | 61 % | 25 % | 24.2% | | 15% | |
| > 32 μm | | 62 % | 70 % | 71.8% | | 35% | |
| > 10 μm | | | | | | 70% | |

As the following Table shows, there is also some difference in composition of the four types of felspar used. This is of course to be taken into account when preparing the mixture.

|   | $Al_2O_3$ | $Na_2O$ | $K_2O$ | CaO | $SiO_2$ | $Fe_2O_3$ |
|---|---|---|---|---|---|---|
| 1 | 17.8 | 3.4 | 11.2 | 0.5 | 66.6 | — |
| 2 | 23.0 | 0.6 | 10.0 | 0.15 | 66.3 | 0.12 |
| 3 | 20.3 | 0.7 | 10.7 | 0.05 | 68.2 | 0.13 |
| 4 | 13.8 | 4.6 | 3.0 | 1.0 | 77.0 | — |

The results are summarized in the following Table

| melt no. | sand | felspar | free from inclusions within (min.) |
|---|---|---|---|
| 1 | >100(1) | ~200(1) | 160 |
| 2 | >100(1) | <100(4) | 135 |
| 3 | <100(2) | <100(4) | 55 |
| 4 | >100(1) | <100(2) | 135 |
| 5 | >100(1) | <100(3) | 135 |
| 6 | <100(2) | <100(2) | 75 |
| 7 | <100(2) | <100(3) | 55 |
| 8 | <100(3) | <100(3) | 85 |
| 9 | <100(3) | <100(2) | 90 |

Also as regards the occurrence of "knobs", i.e. regions having a high $SiO_2$ content in the glass a considerable improvement is achieved according to the invention. The above-mentioned melts 3, 6, 7, 8 and 9 melted at 1300°C are free from knobs after approximately half an hour. When a mixture not according to the invention (1) is melted, this is the case only after 2½ hours under these circumstances.

What I claimed is:

1. A method of manufacturing a glass mixture intended for the manufacture of lead glass, comprising the steps of:
providing a mixture of glass-making ingredients comprising quartz sand, felspar, and other components consisting essentially of the following in percentage by weight:

| $SiO_2$ | 20–65 | | ZnO | 0–12 |
| $B_2O_3$ | 0–25 | | PbO | 12–60 |
| $Na_2O$ | 0–16 | combined | $Al_2O_3$ | 0.5–5 |
| $K_2O$ | 0–16 | >1.5 | $As_2O_3$ and/or | 0–1 |
| CaO | 0–4 | | $Sb_2O_3$ | |
| BaO | 0–8 | | MnO | 0–1 | wherein said quartz sand has a particle size no more than 100 μm and said felspars have a particle size no more than 100 μm;
producing a glass melt from said mixture substantially free from gas inclusions.

2. A glass, comprising quartz sand, felspar, and other glass-forming components, consisting essentially of the following in percentage by weight:

| $SiO_2$ | 20–65 | | ZnO | 0–12 |
| $B_2O_3$ | 0–25 | | PbO | 12–60 |
| $Na_2O$ | 0–16 | combined | $Al_2O_3$ | 0.5–5 |
| $K_2O$ | 0–16 | >1.5 | $As_2O_3$ and/or | 0–1 |
| CaO | 0–4 | | $Sb_2O_3$ | |
| BaO | 0–8 | | MnO | 0–1 | wherein said quartz sand has a particle size no more than 100 μm, and said felspars have a particle size no more than 100 μm prior to melting.

* * * * *

UNITED STATES PATENT AND TRADEMARK OFFICE
CERTIFICATE OF CORRECTION

PATENT NO. : 3,970,465
DATED : July 20, 1976
INVENTOR(S) : MATHIJS MARIA HENDRIKUS HOUBEN It is certified that error appears in the above-identified patent and that said Letters Patent are hereby corrected as shown below:

Column 1, line 52, "to" should be --for--

Signed and Sealed this

Fifteenth Day of February 1977

[SEAL]

Attest:

RUTH C. MASON
*Attesting Officer*

C. MARSHALL DANN
*Commissioner of Patents and Trademarks*